United States Patent [19]
Nakamura et al.

[11] Patent Number: 5,620,078
[45] Date of Patent: Apr. 15, 1997

[54] STROKE CONTROL DEVICE FOR AN ACTUATOR ROD OF A LINEAR ACTUATOR

[75] Inventors: Kenichiro Nakamura, Otsu; Toshio Mitsuyama, Hirakata; Makoto Kishida, Kyoto, all of Japan

[73] Assignee: Tsubakimoto Chain Co., Osaka, Japan

[21] Appl. No.: 569,448

[22] Filed: Dec. 8, 1995

[30] Foreign Application Priority Data

Dec. 9, 1994 [JP] Japan .................................. 6-331008

[51] Int. Cl.⁶ ........................................................ F16D 71/00
[52] U.S. Cl. ........................ 192/142 R; 192/150; 310/13
[58] Field of Search ................................ 192/142 R, 141, 192/150; 310/13, 23

[56] References Cited

U.S. PATENT DOCUMENTS

| | | | |
|---|---|---|---|
| 4,307,799 | 12/1981 | Zouzoulas | 192/141 X |
| 4,679,451 | 7/1987 | Nakamura | 74/606 |
| 4,727,762 | 3/1988 | Hayashi | 74/89.15 |
| 4,763,219 | 8/1988 | Nakamura | 361/23 |
| 4,910,419 | 3/1990 | Hayashi et al. | 310/13 |
| 5,002,172 | 3/1991 | Stringer | 192/142 R |

FOREIGN PATENT DOCUMENTS

| | | |
|---|---|---|
| 4-62946 | 5/1992 | Japan . |
| 6-20944 | 3/1994 | Japan . |

*Primary Examiner*—Andrea L. Pitts
*Attorney, Agent, or Firm*—Armstrong, Westerman, Hattori, McLeland & Naughton

[57] ABSTRACT

A device providing an accurate adjustment of the length of a reciprocating stroke of an actuating rod of a linear actuator. The stroke control device includes a cam-plate mounting shaft 9 horizontally disposed within a limit switch box so that a plurality of limit-switch actuating cam plates 11A–11C mounted on the mounting shaft 9 for actuation of a corresponding number of limit switches LA–LC to control the stroke length of the actuating rod can be observed in one view as a horizontal array of laterally spaced, vertically disposed cam plates.

1 Claim, 4 Drawing Sheets

STROKE CONTROL DEVICE FOR AN ACTUATOR ROD OF A LINEAR ACTUATOR

FIELD OF THE INVENTION

The present invention relates to a device for arbitrarily controlling a stroke length of the actuating rod of an electrically operated linear actuator to ensure that the actuator properly operates to push or pull an object attached to a front end of the actuating rod.

DESCRIPTION OF THE RELATED ART

A stroke control means or device of a conventional linear actuator is disclosed in Japanese Utility Model Laid-open Publication No. 6-20944, for example. The conventional stroke control device, as shown in FIG. 6, includes a worm 21 formed on the outer periphery of a rotating drive screw shaft 20, and a worm gear 22 externally meshing with the worm 21 and having a vertical shaft 23 projecting into a limit switch box 29 so that rotation of the vertical shaft 23 is transmitted at a reduced rate or speed, via a speed reducing mechanism composed of a train of spur gears 25, 26 and 27, to a rotatably supported, limit-switch actuating cam-plate mounting vertical shaft 28.

In the conventional stroke control device thus constructed, since the limit-switch actuating cam-plate mounting vertical shaft 28 is disposed vertically or upright within the limit switch box 29, a plurality of limit-switch actuating cam plates 30, 31 mounted on the cam-plate mounting vertical shaft 28 cannot be visually observed with ease when viewed downwards from a top cover of the limit switch box 28 because the cam plate 31 mounted on the cam-plate mounting shaft 28 below the cam plate 30 is blocked from the view by the upper cam plate 30. To deal with this difficulty, while a set screw of the lower cam plate 31 is loosened, the lower cam plate 31 is angularly moved or turned about the cam-plate mounting vertical shaft 28 until a striker projecting from the lower cam plate 31 is set to a desired angular position to thereby adjust the limit-switch actuating timing. Then, the set screw is tightly fastened to secure the lower cam plate 31 to the cam-plate mounting vertical shaft 28. Thereafter, the upper can plate 30 is adjusted in the same manner as described above. Thus, the conventional stroke control device has a problem that a cam-position adjustment and setting work is extremely tedious and time-consuming.

SUMMARY OF THE INVENTION

To solve the foregoing problem of the prior art, the present invention provides a stroke control device which comprises a worm formed on an outer peripheral surface of a rotating drive screw shaft, a worm gear externally meshing the worm and having a vertical shaft projecting into a limit switch box so that rotation of the vertical shaft is transmitted via a speed reducing mechanism to a worm gear provided on a limit-switch actuating cam-plate mounting horizontal shaft rotatably supported within the limit switch box, a plurality of limit-switch actuating cam plates rotatably and adjustably mounted on an outer peripheral surface of the limit-switch actuating cam-plate mounting horizontal shaft for adjustment of the stroke of back and forth movement of the actuating rod, and a plurality of limit switches mounting within the limit switch box in corresponding relation to the respective limit-switch actuating cam plates.

By virtue of the limit-switch actuating cam-plate mounting horizontal shaft disposed horizontally within the limit switch box, the plurality of limit-switch actuating cam plates extending radially outwardly from the horizontal mounting shaft can be visually observed as a horizontal array of laterally spaced cam plates with vertical posture rather than a stack of vertically overlapping cam plates when viewed with a top cover of the limit switch box re-moved, so as to achieve an adjustment of the angular position of the respective cam plates until a striker projecting from each cam plate is set in a desired angular position. Under such visual observation, an angular-position adjustment work of the cam plates can be achieved with utmost ease.

The invention will be described in further detail with reference to the drawings.

DESCRIPTION OF THE PREFERRED EMBODIMENT

Figure 1:
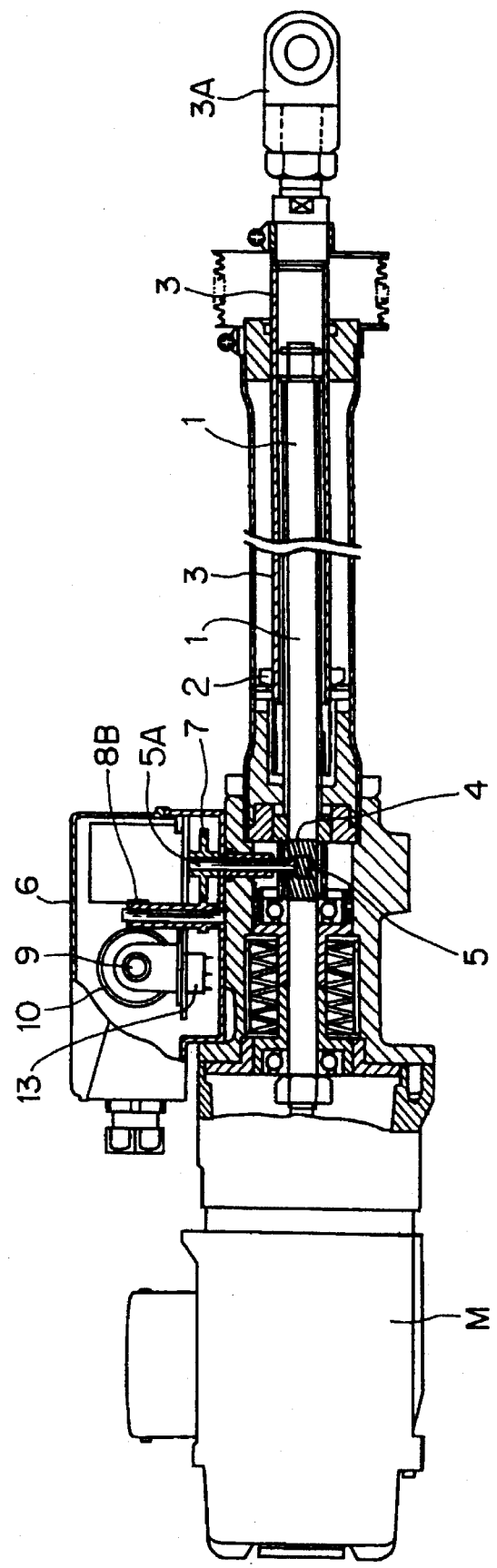
FIG. 1 is a cross-sectional view, in front elevation, of a linear actuator according to the present invention.

FIG. 1 is a cross-sectional view, in front elevation, of a linear actuator according to the present invention. The linear actuator is similar in structure to the conventional linear actuator to the extent that it has a structure in which a motor M rotates a screw shaft 1 whereupon a nut 2 threaded with the screw shaft 1 and an actuating rod 3 engaged with the nut 3 are caused to move together back and forth along the screw shaft 1 to thereby reciprocate a movable part or object (not shown) connected to a front end 3A of the actuating rod 3. Due to the structural similarity, a further detailed description of this structure will be omitted.

Figure 2:
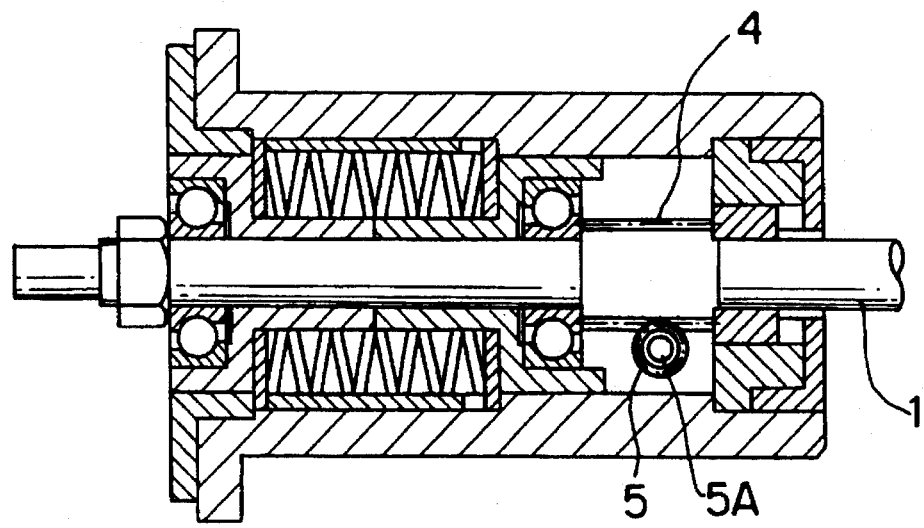
FIG. 2 is an enlarged plan view of an essential part of FIG. 1.
Figure 3:
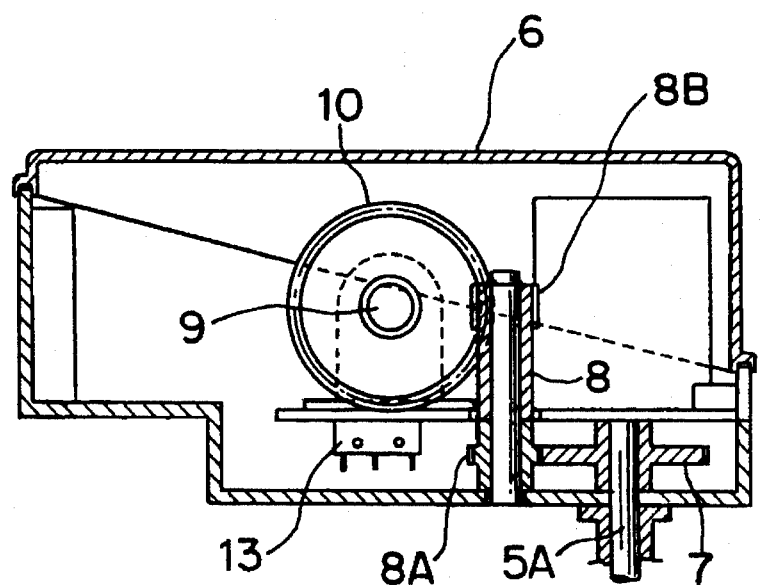
FIG. 3 is an enlarged cross-sectional view, in front elevation, of a limit switch box shown in FIG. 1.
Figure 4:
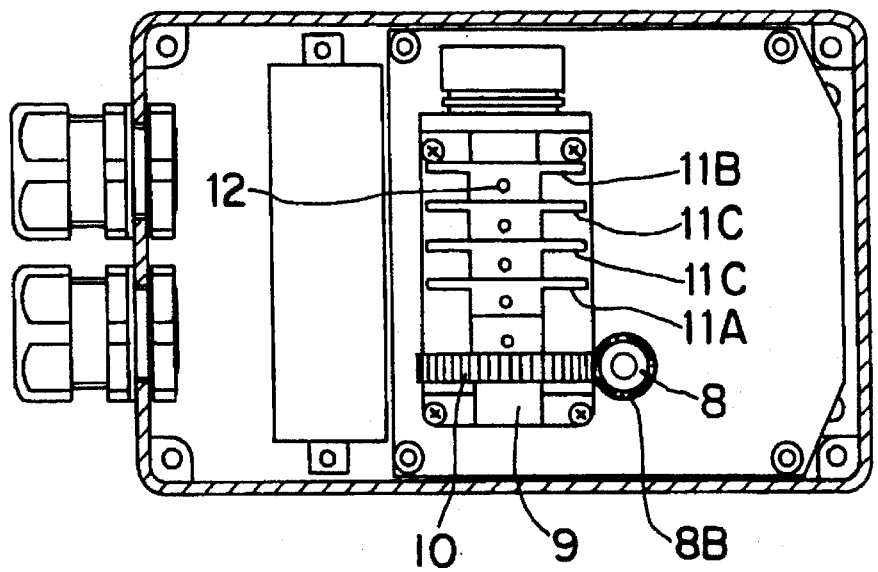
FIG. 4 is an enlarged plan view of the limit switch box of FIG. 3.

As shown in enlarged scale in FIG. 2, a worm 4 is formed on an outer peripheral surface of the screw shaft 1. A worm gear 5 externally meshes with the worm 4 and has a vertical shaft 5A projecting into a limit switch box 6, as shown in FIG. 3. The vertical shaft 5A has a spur gear 7 fixedly mounted on a projecting front end portion thereof and held in mesh with a gear 8A formed on an outer peripheral surface of a vertical rotating tube 8. The rotating tube 8 has formed on an outer peripheral surface of its upper portion a worm 8B which meshes with a worm gear 10 fixedly mounted on a limit-switch actuating cam-plate mounting horizontal shaft (hereinafter referred to as "cam-plate mounting horizontal shaft") 9 rotatably supported or journaled within the limit switch box 6, as shown in FIG. 4.

Figure 5:
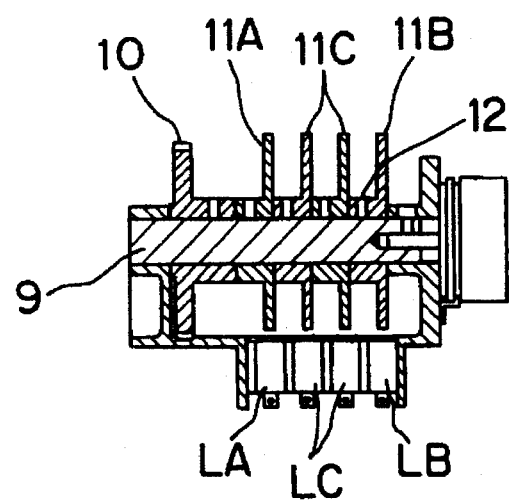
FIG. 5 is an enlarged cross-sectional view, in side elevation, of a cam-plate mounting horizontal shaft shown in FIG. 4.
Figure 6:
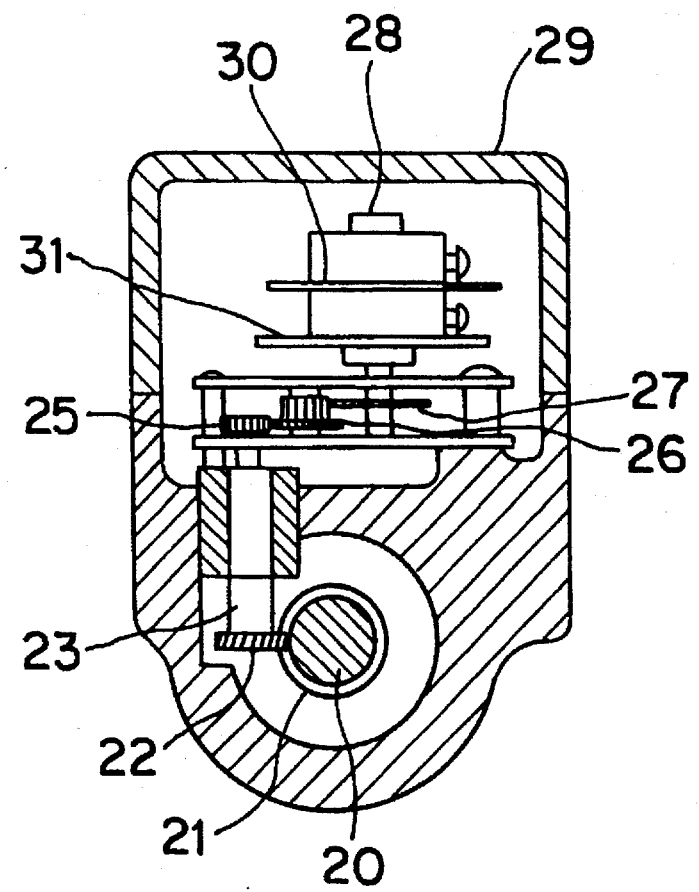
FIG. 6 is a cross-sectional view, in side elevation, of a conventional limit switch box.

A top or forward stroke end limit-switch actuating cam plate 11A, a bottom or reverse stroke end limit-switch actuating cam plate 11B, and a plurality of intermediate stroke limit-switch actuating cam plates 11C, 11C are rotatably and adjustably mounted in side by side relation on the outer peripheral surface of the cam-plate mounting horizontal shaft 9 by means of set screws 12, respectively. As shown in FIG. 5, a top end limit switch LA, a bottom end limit switch LB, and a plurality of intermediate limit switches LC, LC are attached to a limit-switch mounting plate 13 (FIG. 3) within the limit switch box 6 and arranged in corresponding relation to the respective cam plates 11A, 11B, 11C and 11C for actuation by the latter.

The meshing engagement between the worm 4 and the worm gear 5, the meshing engagement between the worm 8B and the worm gear 10 and the ratio of the number of teeth of the spur gear 7 to the number of teeth of the spur gear 8A are properly adjusted such that the number of revolutions of the screw shaft 1 due for achieving a maximum stroke of the actuating rod 3 is reduced to a little under one revolution of the cam-plate mounting horizontal shaft 9. The adjustment of such speed reducing gear train or mechanism can be also effected by using a known adjusting means.

The worm 4 formed on the outer peripheral surface of the screw shaft 1 has an axial length or an extent in the longitudinal direction of the screw shaft 1 which is large enough to maintain meshing engagement between the worm 4 and the worm gear 5 even when the screw shaft 1 is axially displaced due to a change in the load exerted on the actuating rod 3.

According to the present invention, since the vertical shaft of a worm gear held in mesh with a worm of a screw shaft has a spur gear, and since a worm and a worm gear meshing together are provided to rotate a cam-plate mounting horizontal shaft via a meshing engagement between the spur gear and another spur gear, the cam-plate mounting shaft can be rotated at a high reduction ratio. By virtue of the cam-plate mounting shaft journaled within a limit switch box as a horizontal shaft, the entire length of the horizontal shaft can be visually observed when a cover of the limit switch box is removed. Accordingly, a plurality of limit-switch actuating cam plates rotatably and adjustably mounted on the horizontal shaft can be observed in one view as a horizontal array of laterally spaced cam plates with vertical posture rather than a stack of vertically overlapping cam plates. Under such visual observation, a work for adjusting the angular position of the respective cam plates can be achieved with high accuracy, thus making it possible to adjust the actuating timing of the corresponding limit switches to eventually provide desired stroke lengths of the actuating rod. Thus, the stroke lengths of the actuating rod can be adjusted with high accuracy.

What is claimed is:

1. In a linear actuator having an actuating rod threaded with a rotating drive screw shaft and movable back and forth along the rotating drive screw shaft, a stroke control device for controlling a stroke of the actuating rod, said stroke control device comprising in combination:

a worm formed on an outer peripheral surface of the rotating drive screw shaft, a worm gear externally meshing with said worm and having a vertical worm gear shaft projecting into a limit switch box, a cam plate mounting shaft rotatably supported within said limit switch box for rotation about a substantially horizontal axis, a plurality of limit-switch actuating cam plates rotatably and adjustably mounted on an outer peripheral surface of said cam-plate mounting shaft for adjustment of the back and forth movement stroke of the actuating rod, a second worm gear fixed to said cam-plate mounting shaft, speed reducing means drivingly engaging said worm gear shaft and said second worm gear to transmit rotation of said worm gear shaft to said cam plate mounting shaft, and a plurality of limit switches mounted within said limit switch box in locations corresponding to each respective limit-switch actuating cam plate.

\* \* \* \* \*

UNITED STATES PATENT AND TRADEMARK OFFICE
CERTIFICATE OF CORRECTION

PATENT NO. : 5,620,078
DATED : April 15, 1997
INVENTOR(S) : NAKAMURA et al.

It is certified that error appears in the above-indentified patent and that said Letters Patent is hereby corrected as shown below:

On the title page, item [54] and column 1, line 2, change "ACTUATOR" to --ACTUATING--.

Signed and Sealed this

Fifth Day of August, 1997

Attest:

BRUCE LEHMAN

*Attesting Officer*    *Commissioner of Patents and Trademarks*